United States Patent
Cho et al.

(10) Patent No.: US 11,237,753 B2
(45) Date of Patent: Feb. 1, 2022

(54) SYSTEM INCLUDING DATA STORAGE DEVICE AND METHOD OF CONTROLLING DISCARD OPERATION IN THE SAME

(71) Applicant: SAMSUNG ELECTRONICS CO., LTD., Suwon-si (KR)

(72) Inventors: Sung-Hyun Cho, Hwaseong-si (KR); Kyung-Mun Kang, Busan (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 85 days.

(21) Appl. No.: 16/533,256

(22) Filed: Aug. 6, 2019

(65) Prior Publication Data

US 2020/0201558 A1    Jun. 25, 2020

(30) Foreign Application Priority Data

Dec. 19, 2018    (KR) .................. 10-2018-0165161

(51) Int. Cl.
*G06F 3/06*    (2006.01)
(52) U.S. Cl.
CPC .......... *G06F 3/0652* (2013.01); *G06F 3/0608* (2013.01); *G06F 3/0659* (2013.01); *G06F 3/0673* (2013.01)
(58) Field of Classification Search
CPC .................................................. G06F 3/0652
See application file for complete search history.

(56) References Cited

U.S. PATENT DOCUMENTS

| | | | |
|---|---|---|---|
| 9,128,746 B2 | 9/2015 | Venkatesan et al. | |
| 9,141,306 B2 | 9/2015 | Maeda | |
| 9,335,930 B2 | 5/2016 | Benhase et al. | |
| 9,477,596 B2 | 10/2016 | Post et al. | |
| 9,734,098 B2 | 8/2017 | Gavens et al. | |
| 2008/0098159 A1 | 4/2008 | Song et al. | |
| 2016/0034198 A1 | 2/2016 | Jogand-Coulomb et al. | |
| 2016/0085454 A1* | 3/2016 | Benhase | G06F 3/0608 711/114 |
| 2016/0124673 A1* | 5/2016 | Feng | G06F 12/0802 711/113 |
| 2017/0344573 A1 | 11/2017 | Eom et al. | |

* cited by examiner

*Primary Examiner* — David E Martinez
(74) *Attorney, Agent, or Firm* — F. Chau & Associates, LLC

(57) ABSTRACT

A method of controlling discard operations is performed in a system that includes a host device and a data storage device. The method includes providing a shared discard bitmap accessed commonly by the host device and data storage device. The shared discard bitmap includes discard bits in one-to-one correspondence with target sectors of a nonvolatile memory device in the data storage device. The method also includes setting bit values of the discard bits stored in the shared discard bitmap, the bit values indicating whether data stored in each of the target sectors are discardable. An asynchronous discard operation may then be performed with respect to the target sectors based on the bit values of the discard bits stored in the shared discard bitmap.

14 Claims, 22 Drawing Sheets

FIG. 14

| ASYNC_DISCARD_SECTOR_ADDR [A1_3:A1_0] <br> - ATTRIBUTE : R/W/E <br> - SIZE : 4BYTES ||
|---|---|
| EXT_CSD[A1_3] | ASYNC_DISCARD_SECTOR_ADDR_3 |
| EXT_CSD[A1_2] | ASYNC_DISCARD_SECTOR_ADDR_2 |
| EXT_CSD[A1_1] | ASYNC_DISCARD_SECTOR_ADDR_1 |
| EXT_CSD[A1_0] | ASYNC_DISCARD_SECTOR_ADDR_0 |

FIG. 15

| ASYNC_DISCARD_SECTOR_CNT [A2_3:A2_0] <br> - ATTRIBUTE : R/W/E <br> - SIZE : 4BYTES ||
|---|---|
| EXT_CSD[A2_3] | ASYNC_DISCARD_SECTOR_CNT_3 |
| EXT_CSD[A2_2] | ASYNC_DISCARD_SECTOR_CNT_2 |
| EXT_CSD[A2_1] | ASYNC_DISCARD_SECTOR_CNT_1 |
| EXT_CSD[A2_0] | ASYNC_DISCARD_SECTOR_CNT_0 |

FIG. 16

| SHARED_BITMAP_SECTOR_ADDR [S1_3:S1_0] <br> - ATTRIBUTE : R/W/E <br> - SIZE : 4BYTES | |
|---|---|
| EXT_CSD[S1_3] | SHARED_BITMAP_SECTOR_ADDR_3 |
| EXT_CSD[S1_2] | SHARED_BITMAP_SECTOR_ADDR_2 |
| EXT_CSD[S1_1] | SHARED_BITMAP_SECTOR_ADDR_1 |
| EXT_CSD[S1_0] | SHARED_BITMAP_SECTOR_ADDR_0 |

FIG. 17

| SHARED_BITMAP_UNIT_SIZE [S3] <br> - ATTRIBUTE : R/W/E <br> - SIZE : 1BYTE |
|---|
| TARGET SECTOR UNIT SIZE <br> $= 4KB * 2^{SHARED\_BITMAP\_UNIT\_SIZE}$ <br><br> EX) $2MB = 4KB * 2^9$ |

FIG. 18

| SHARED_BITMAP_SECTOR_CNT [S2_3:S2_0] <br> - ATTRIBUTE : R ONLY <br> - SIZE : 4BYTES ||
|---|---|
| EXT_CSD[S2_3] | SHARED_BITMAP_SECTOR_CNT_3 |
| EXT_CSD[S2_2] | SHARED_BITMAP_SECTOR_CNT_2 |
| EXT_CSD[S2_1] | SHARED_BITMAP_SECTOR_CNT_1 |
| EXT_CSD[S2_0] | SHARED_BITMAP_SECTOR_CNT_0 |

FIG. 19

| ASYNC_DISCARD_CTRL [C1] - 1BYTE <br> - ATTRIBUTE : R/W/E <br> - SIZE : 1BYTE ||||||||
|---|---|---|---|---|---|---|---|
| BT7 | BT6 | BT5 | BT4 | BT3 | BT2 | BT1 | BT0 |
| RESERVED ||||||| ASYNC_DISCARD_ENABLE |

SYSTEM INCLUDING DATA STORAGE DEVICE AND METHOD OF CONTROLLING DISCARD OPERATION IN THE SAME

CROSS-REFERENCE TO RELATED APPLICATION

This U.S. non-provisional application claims priority under 35 USC § 119 to Korean Patent Application No. 10-2018-0165161, filed on Dec. 19, 2018 in the Korean Intellectual Property Office, the disclosure of which is incorporated by reference herein in its entirety.

BACKGROUND

1. Technical Field

Example embodiments relate generally to semiconductor integrated circuits, and more particularly to a system including a data storage device and a method of controlling a discard operation in the system.

2. Discussion of the Related Art

Different types of write operations may be used to store data in a memory device. Examples include random write operations and sequential write operations. In a nonvolatile memory device, the performance of random write operations may be enhanced up to the performance of sequential write operations in certain circumstances. Also, certain management functions may be performed to ensure proper operation.

The management functions may vary for different systems. In a log-structured file system (which has been adopted as a basic file system for many operating system (OS) environments), discard operations may be performed between random write operations. The discard operations degrade system performance, especially for storage devices that include a nonvolatile memory.

In an attempt to prevent performance degradation, a host device may retain the discard operations and instruct the collected discard operations to be performed before entering an idle state. However, in some cases, the data to be discarded may include valid data. Also, inefficient garbage collection operations may be performed which further degrade performance and the lifetime of the data storage device. Synchronized discard operations may be performed to prevent the inefficient garbage collection operations. However, in order to implement this approach, the idle state has to be maintained for a long time (e.g., up to 300 seconds) in order to complete the synchronized discard operations. Maintaining the idle state degrades efficiency.

SUMMARY

According to example embodiments, a method of controlling discard operations is performed in a system including a host device and a data storage device. The method includes providing a shared discard bitmap accessed commonly by the host device and the data storage device. The shared discard bitmap includes discard bits in one-to-one correspondence with target sectors, among a plurality of sectors of a nonvolatile memory device in the data storage device. The method also includes setting, by the host device, bit values of the discard bits stored in the shared discard bitmap, where the bit values set to indicate whether data stored in each of the target sectors are discardable. The method also includes performing, by the data storage device, an asynchronous discard operation with respect to the target sectors based on the bit values of the discard bits stored in the shared discard bitmap.

According to example embodiments, a method of controlling discard operations is performed in a system including a host device and a data storage device. The method includes setting an address range of target addresses among a plurality of sectors of a nonvolatile memory device included in the data storage device and setting an address range of a shared discard bitmap accessed commonly by the host device and the data storage device. The shared discard bitmap includes discard bits in one-to-one correspondence with the target sectors. The method also includes setting, by the host device, bit values of the discard bits stored in the shared discard bitmap, where the bit values indicating whether data stored in respective ones of the target sectors are discardable. In addition, the method includes performing, by the data storage device, an asynchronous discard operation with respect to the target sectors based on the bit values of the discard bits stored in the shared discard bitmap.

According to example embodiments, a system includes a shared discard bitmap including discard bits in one-to-one correspondence with target sectors among a plurality of sectors of a nonvolatile memory device, a host device configured to set bit values of the discard bits stored in the shared discard bitmap, where the bit values set to indicate whether data stored in each of the target sectors are discardable, and a data storage device configured to perform an asynchronous discard operation with respect to the target sectors. The asynchronous discard operation is to be performed based on the bit values of the discard bits stored in the shared discard bitmap. Also, the data storage device includes the nonvolatile memory device.

BRIEF DESCRIPTION OF THE DRAWINGS

Example embodiments of the present disclosure will be more clearly understood from the following detailed description taken in conjunction with the accompanying drawings.

FIGS. 14 and 15 illustrate embodiments of setting an address range of target sectors.

FIGS. 16, 17, and 18 illustrate an embodiment of setting an address range of a shared discard bitmap.

FIG. 19 illustrates an embodiment for setting a mode.

DETAILED DESCRIPTION OF THE EMBODIMENTS

Figure 1:
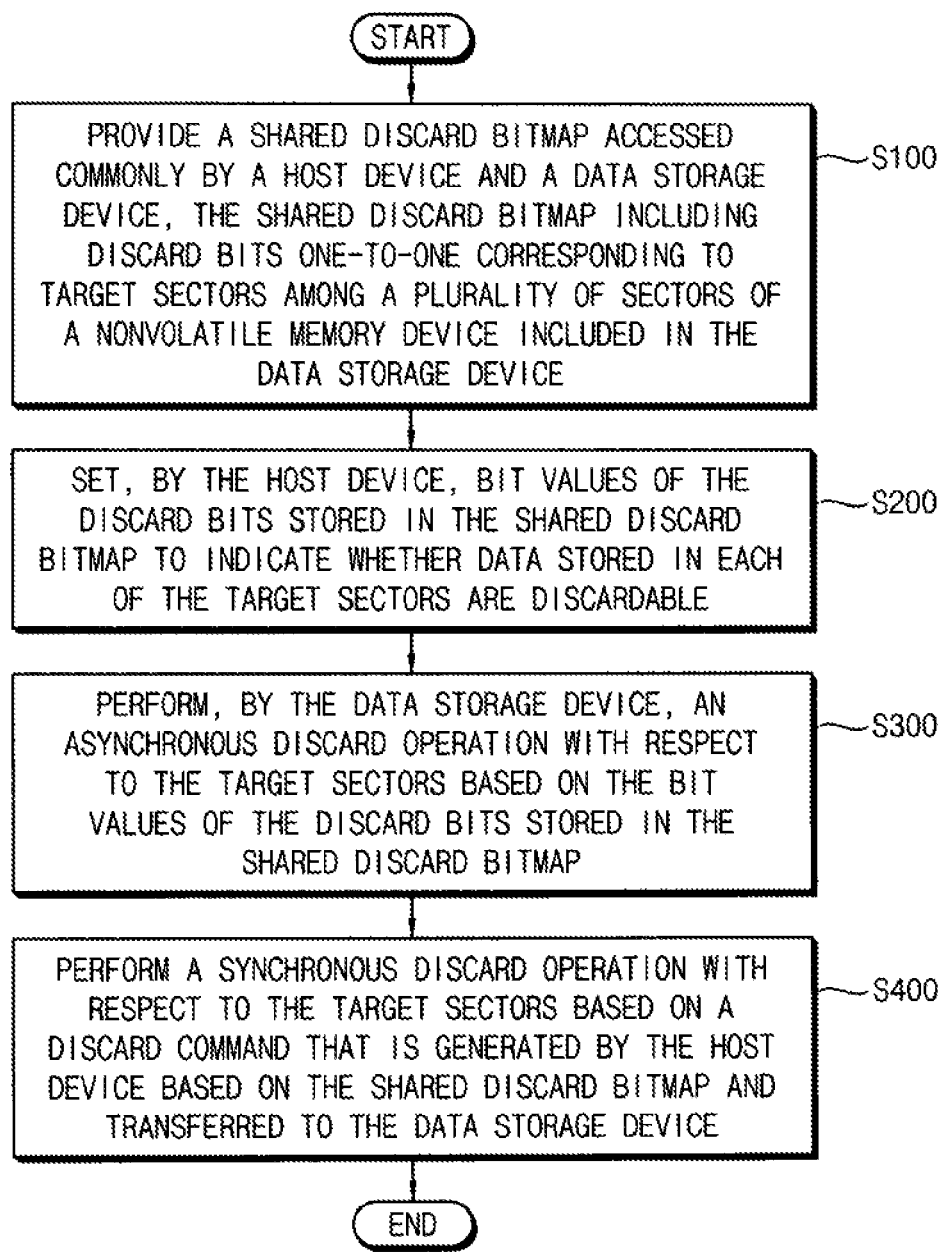
FIG. 1 illustrates an embodiment of a method of controlling discard operations.

Various example embodiments will be described more fully hereinafter with reference to the accompanying drawings, in which some example embodiments are shown. In the drawings, like numerals refer to like elements throughout. The repeated descriptions may be omitted.

FIG. 1 illustrates an embodiment of a method of controlling discard operations in a system which includes a data storage device. Referring to FIG. 1, the method includes providing a shared discard bitmap (S100). The shared discard bitmap may be accessed commonly by a host device and a data storage device. The shared discard bitmap may include discard bits in one-to-one correspondence with target sectors, among a plurality of sectors of a nonvolatile memory device in the data storage device. In one embodiment, a "sector" may indicates a set of memory cells or an address range corresponding to the set of memory cells. The size of the sector may be independent of the size of a memory block that serves as a unit of an erase operation. The size of the sector may be equal to or different from the size of the memory block. Example embodiments of discard bits of the shared discard bitmap will be described below with reference to FIG. 3.

Bit values of the discard bits stored in the shared discard bitmap may be set by the host device (S200). The bit values of the discard bits may indicate whether data stored in respective ones of the target sectors are discardable. Each discard bit may have a first value or a second value. When a discard bit has the first value, this may indicate that the corresponding target sector is undiscardable. When a discard bit has the second value, this may indicate that the corresponding target sector is discardable. For example, the first value may be "0" and the second value may be "1." Example embodiments for setting the bit values of the discard bits by the host device will be described below with reference to FIGS. 7 and 8.

An asynchronous discard operation may be performed by the data storage device with respect to the target sectors based on the bit values of the discard bits stored in the shared discard bitmap (S300). In one embodiment, an "asynchronous discard operation" may indicate a discard operation performed by the data storage device based on the shared discard bitmap regardless of information (e.g., commands) from the host device. As will be described below, an asynchronous discard operation may be performed during an idle state of the host device. Example embodiments of the asynchronous discard operation will be described below with reference to FIGS. 9 and 10.

A synchronous discard operation may be performed with respect to the target sectors (S400). For example, a synchronous discard operation may be performed based on a discard command transferred to the data storage device. The discard command may be generated by the host device based on the shared discard bitmap. Example embodiments of the synchronous discard operation will be described below with reference to FIGS. 11 and 12.

Figure 2:
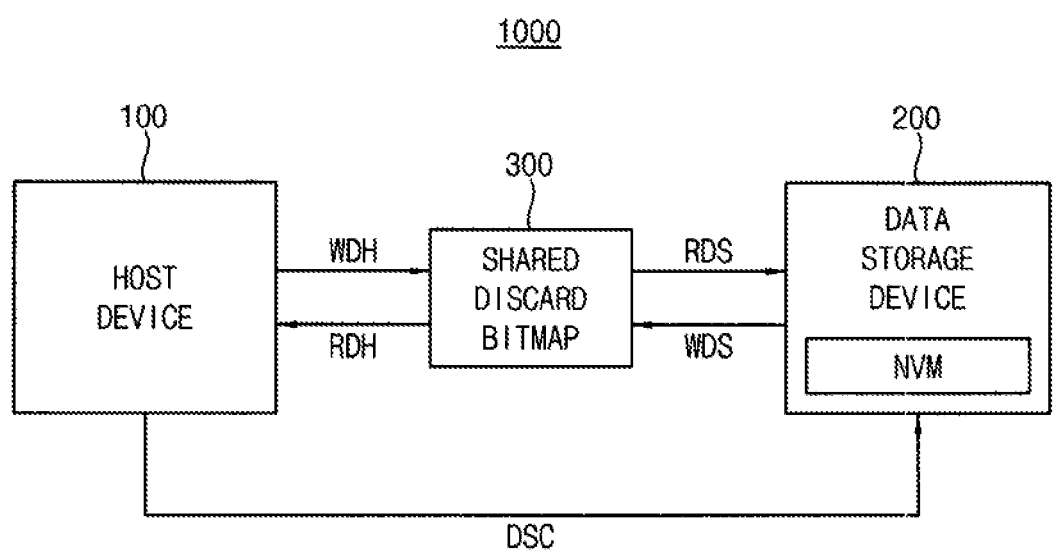
FIG. 2 illustrates an embodiment of a system.

FIG. 2 illustrates an embodiment of a system 1000 which may include a host device 100, a data storage device 200, and a shared discard bitmap 300. The shared discard bitmap is illustrated between the host device 100 and the data storage device 200. According to example embodiments, the shared discard bitmap 300 may be included in the data storage device 200 or the host device 100.

The shared discard bitmap 300 includes discard bits that are in one-to-one correspondence with target sectors, among a plurality of sectors of a nonvolatile memory device NVM in the data storage device 200. The shared discard bitmap 300 is shared by the host device 100 and the data storage device 200. For example, the shared discard bitmap 300 may be accessed commonly and independently by the host device 100 and the data storage device 200. The host device 100 may set or change bit values of the discard bits stored in the shared discard bitmap 300 by reading the bit values as read data RDH and providing the bit values as write data WDH. In addition, the data storage device 200 may set or change bit values of the discard bits stored in the shared discard bitmap 300 by reading the bit values as read data RDS and providing the bit values as write data WDS.

The host device 100 may set the bit values of the discard bits stored in the shared discard bitmap 300 to indicate whether data stored in each of the target sectors are discardable, e.g., the host device 100 may perform the operation S200 in FIG. 1.

The data storage device 200 may perform an asynchronous discard operation with respect to the target sectors based on a discard command DSC, which is transferred to the data storage device 200 and which is generated by the host device 100 based on the shared discard bitmap 300. The host device 100 and the data storage device 200 may therefore perform the operation S400 in FIG. 1.

As a result, the system 1000 and the method of controlling discard operations according to example embodiments may enhance operational speed and extend the lifetime and performance of the system 1000, by performing asynchronous discard operations and/or synchronous discard operations using the shared discard bitmap 300 shared by the host device 100 and the data storage device 200.

Figure 3:
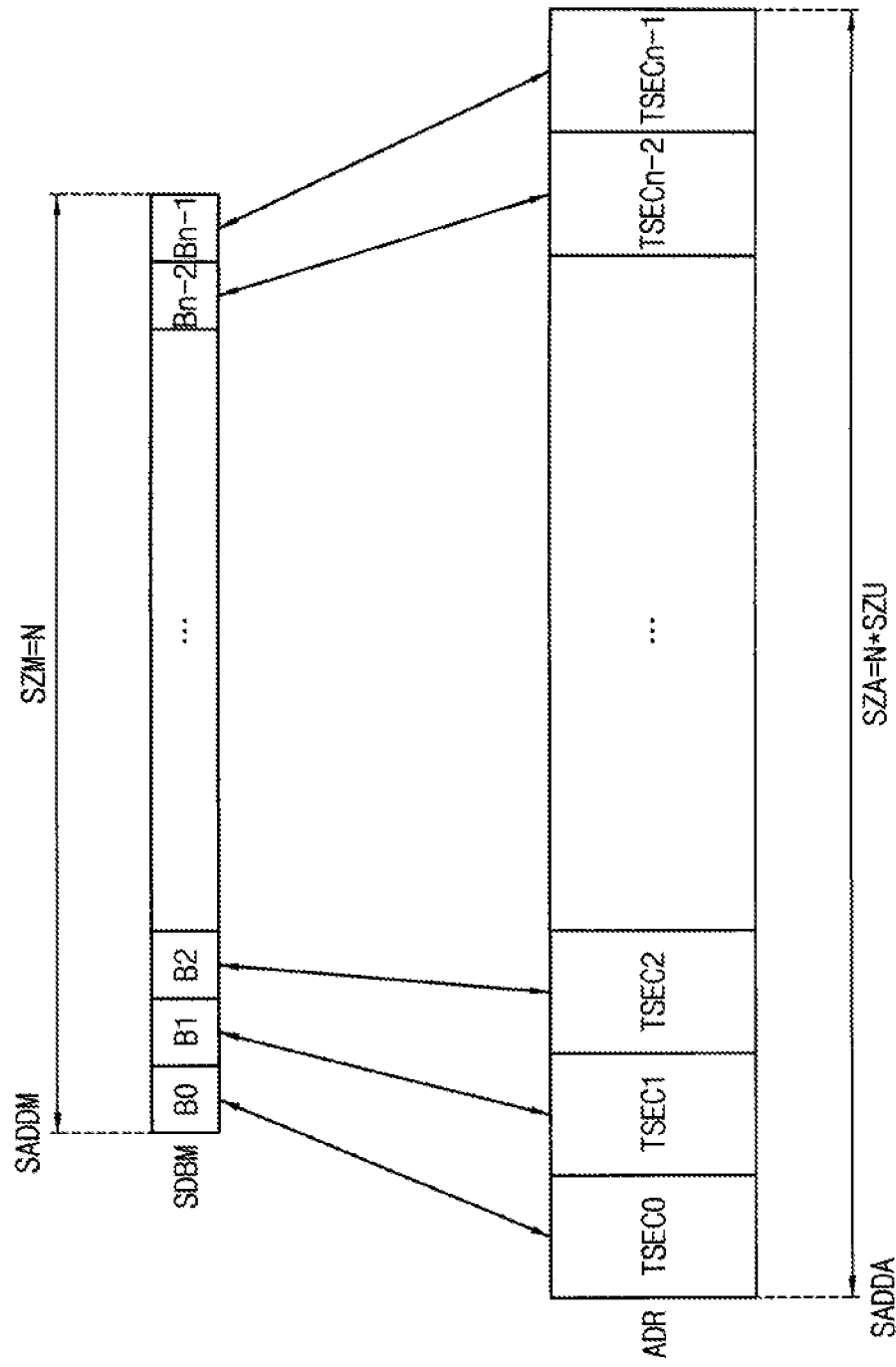
FIG. 3 illustrates an embodiment of a shared discard bitmap.

FIG. 3 illustrates an embodiment of a shared discard bitmap, which, for example, may be included in the system of FIG. 2. Referring to FIG. 3, a shared discard bitmap SDBM may include a plurality of discard bits B0~Bn−1 and a synchronous discard region ADR may include a plurality of target sectors TSEC0~TSECn−1. The synchronous discard region ADR may correspond to a portion or all of a plurality of sectors in a memory region of the nonvolatile memory device. Each of the discard bits B0~Bn−1 may be one binary digit and each of the target sector TSEC0~TSECn−1 may have a unit size SZU.

As illustrated in FIG. 3, the number N of the discard bits B0~Bn−1 may be equal to the number N of the target sectors TSEC0~TSECn−1. The discard bits B0~Bn−1 may correspond to respective ones of the target sector TSEC0~TSECn−1. For example, a first discard bit B0 may correspond to a first target sector TSEC0, a second discard bit B1 may correspond to a second target sector TSEC1, and so on, with an N-th discard bit Bn−1 corresponding to an N-th target sector TSECn−1.

The values of the discard bits B0~Bn−1 may indicate whether the corresponding target sectors are discardable. For example, when a discard bit has a first value (e.g., 0), this may indicate that the corresponding target sector is undiscardable. When a discard bit has a second value (e.g., "1"), this may indicate that the corresponding target sector is discardable.

In some example embodiments, the address range of the asynchronous discard range ADR may be set by a start address SADDA of the target sector TSEC0~TSECn−1 and a size SZA of the asynchronous discard range ADR. The size SZA may correspond to the product SZU*N, where SZU indicates a unit size of each target sector and N indicates the number of target sectors TSEC0~TSECn−1. Therefore, the address range of the asynchronous discard range ADR may be set by the start address SADDA and the number N of the target sectors TSEC0~TSECn−1 in the asynchronous discard region ADR.

Similarly, the address range of the shared discard bitmap SDBM may be set by a start address SADDM of the shared discard bitmap SDBM and a size SZM of the shared discard bitmap SDBM. Each discard bit may be one bit, and the address range of the shared discard bitmap SDBM may be set by the start address SADDM and the number N of discard bits B0~Bn−1 in the shared discard bitmap SDBM.

Figure 4:
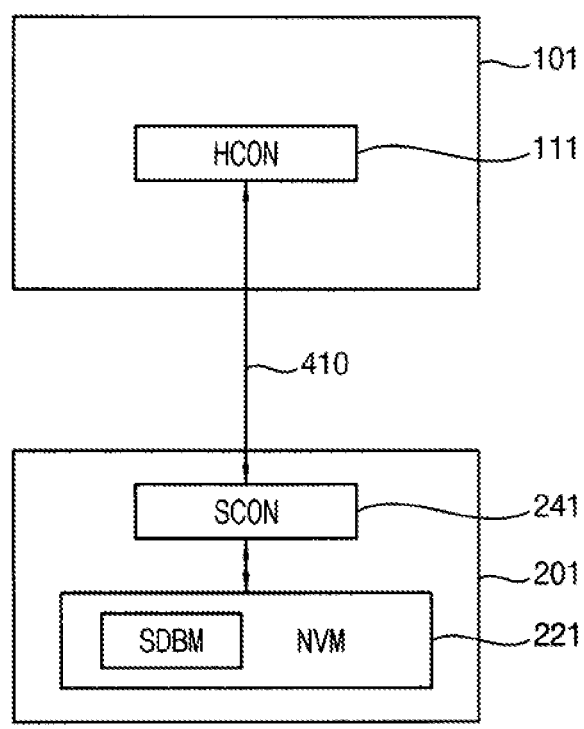
FIG. 4 illustrates another embodiment of a system.

FIG. 4 illustrates an embodiment of a system 1001 which includes a host device 101 and the storage device 201. The host device 101 may include a host controller HCON 111, which, for example, may be a central processing unit (CPU). The storage device 201 may include a nonvolatile memory device NVM 221 and a storage controller SCON 241.

In some example embodiments, as illustrated in FIG. 4, the above-described shared discard bitmap SDBM may be stored in the nonvolatile memory device 221. In this case, the host device 101 may access the shared discard bitmap SDBM through a block accessible interface 410 between the host device 101 and the data storage device 201.

The host controller 111 may control access to the nonvolatile memory device 221 and overall operations of the host device 101. In one embodiment, the host controller 111 may access the nonvolatile memory device 221 and the shared discard bitmap SDMB using a virtual address space, which, for example, may be described with reference to FIG. 5. The host controller 111 may generate a block access command to access the nonvolatile memory device 221 in units of blocks.

The storage controller 241 may receive the block access command from the host device 101 through the block accessible interface 410. The storage controller 241 may perform the access to the nonvolatile memory device 221 in units of blocks based on the block access command. The block accessible interface 410 may be implemented in hardware (e.g., a bus system), software (e.g., drive program), or a combination of hardware and software.

In some example embodiments, the nonvolatile memory device 221 of the data storage device 201 may be connected to the host controller 111 of the host device 101 through the block accessible interface 410. The block accessible interface 410 may be, for example, a serial advanced technology attachment (SATA) bus, a nonvolatile memory express (NVMe) bus, or a serial attached SCSI (SAS) bus.

The nonvolatile memory device 221 may be an arbitrary memory device that may be accessed by the host device 101 through the block accessible interface 410. For example, the nonvolatile memory device 221 may be implemented, for example, as an electrically erasable programmable read only memory (EEPROM), flash memory, phase change random access memory (PRAM), resistance random access memory (RRAM), nano floating gate memory (NFGM), polymer random access memory (PoRAM), magnetic random access memory (MRAM), ferroelectric random access memory (FRAM), or the like.

Figure 5:
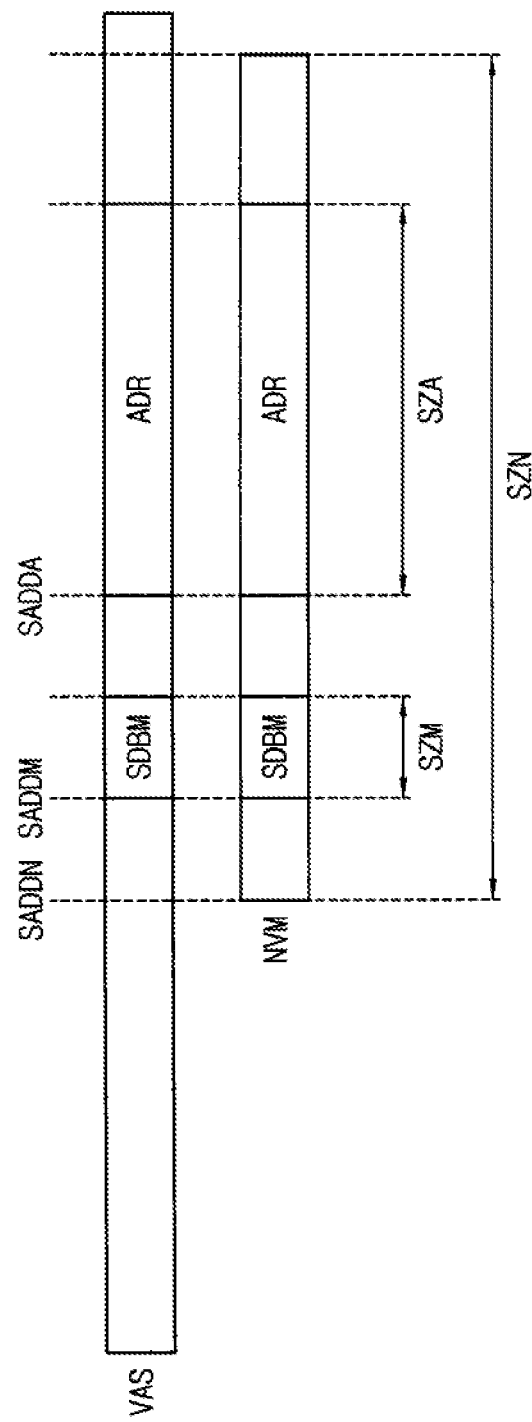
FIG. 5 illustrates an example of address mapping of the system of FIG. 4.

FIG. 5 illustrates an example of address mapping for the system of FIG. 4. Referring to FIG. 5, a virtual address space VAS of the host device 101 may include a shared discard bitmap SDBM and an asynchronous discard region ADR.

The shared discard bitmap SDBM and the asynchronous discard region ADR of the virtual address space VAS are mapped to those of the nonvolatile memory device NVM. The asynchronous discard region ADR may be a portion of or the entire nonvolatile memory device NVM. For example, the size SZA of the asynchronous discard region ADR may be smaller than or equal to the size SZN of the nonvolatile memory device NVM. The shared discard bitmap, which has a size SZM proportional to the size SZA of the asynchronous discard region ADR, may be included in the nonvolatile memory device NVM. The host device 101 may access respective regions of the nonvolatile memory device NVM based on mapping relations between the virtual address space VAS and the nonvolatile memory device NVM.

Figure 6:
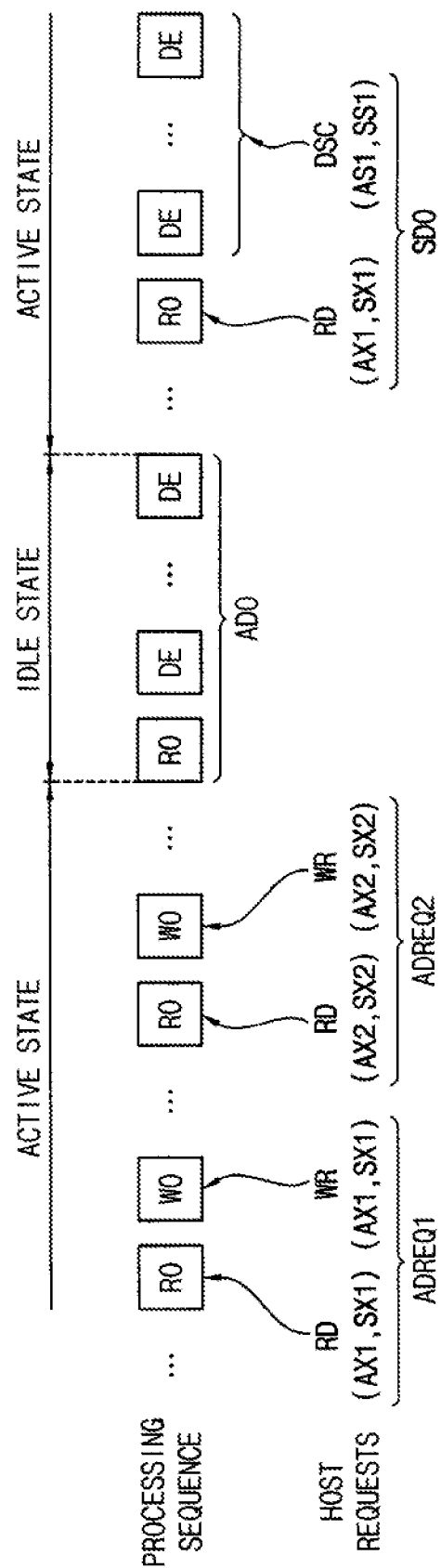
FIG. 6 illustrates an embodiment of a method of controlling discard operations.

FIG. 6 illustrates an embodiment of a method of controlling discard operations, which method may be applied to the case where host requests are generated by the host device and a processing sequence is performed by the data storage device according to the host requests. For example, the host device may generate a first asynchronous discard request ADREQ1 and a second asynchronous discard request ADREQ2 sequentially during an active state of the host device. For convenience of illustration, requests for normal operations (e.g., a read operation, a write operation, an erase operation or the like) are omitted in FIG. 6.

Each of the first asynchronous discard request ADREQ1 and the second asynchronous discard request ADREQ2 may include a read command RD and a write command WR with respect to the shared discard bitmap SDBM. The read command RD and the write command WE may include start addresses AX1 and AX2 and access sizes SX1 and SX2, respectively, indicating address ranges of the shared discard bitmap SDBM. The host device and the data storage device may be connected through the above-described block accessible interface. The access sizes SX1 and SX2 may be arbitrary access units that are independent of a page size. Page size may be related with a unit size of the read operation and the write operation in the nonvolatile memory device. The data storage device may perform the read operation RO and the write operation WO based on a read command RD and write command WR, with respect to the corresponding address ranges of the shared discard bitmap SDBM.

When the host device enters an idle state, the data storage device may perform an asynchronous discard operation ADO. The asynchronous discard operation ADO may be performed based on the shared discard bitmap SDBM, regardless of information (e.g., commands) from the host device during the idle state of the host device. The asynchronous discard operation ADO may include read operation RO by the data storage device and discard operations DE based on the bit values of the discard bits in the shared discard bitmap SDBM. Each discard operation may include an erase operation to delete data in the target sector.

The host device and the data storage device may also perform a synchronous discard operation SDO. The synchronous discard operation SDO may include generation of the read command RD for the shared discard bitmap SDBM and a discard command DSC based on the bit values of the read discard bits. The discard command DSC may include a start address AS1 and an access size SS1 indicating the address range of the target sectors to which the discard operations are performed.

Example embodiments of an asynchronous discard request ADREQ1, an asynchronous discard operation ADO, and a synchronous discard operation SDO will be described with reference to FIGS. 7 to 12.

Figure 7:
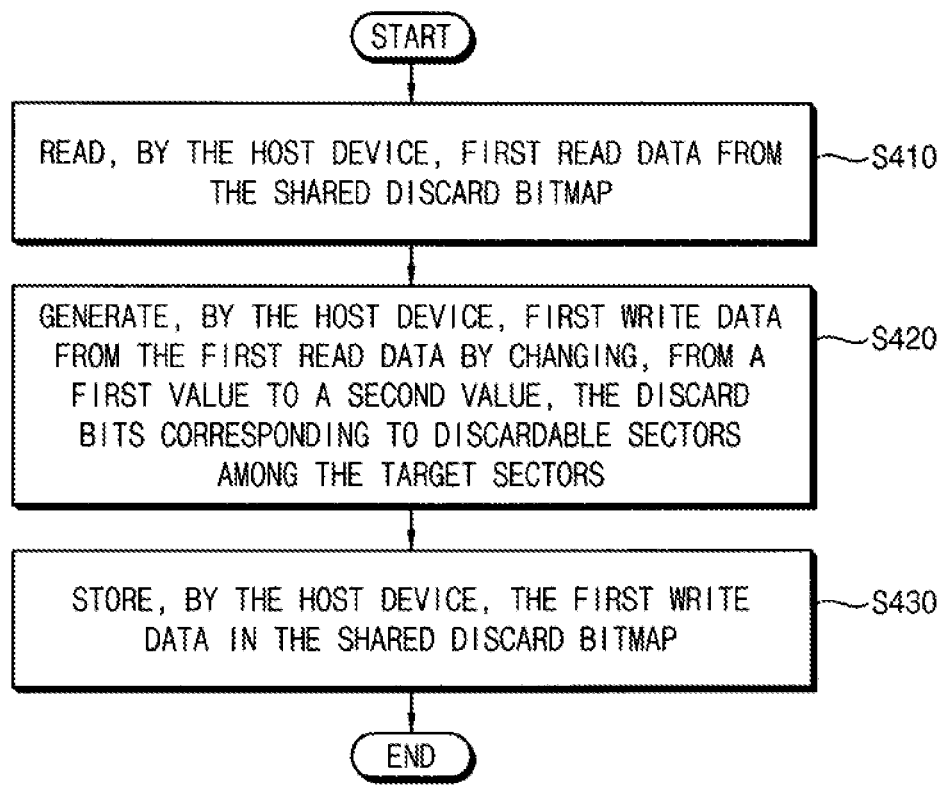
FIG. 7 illustrates an embodiment of a discard request for a method of controlling discard operations.
Figure 8:
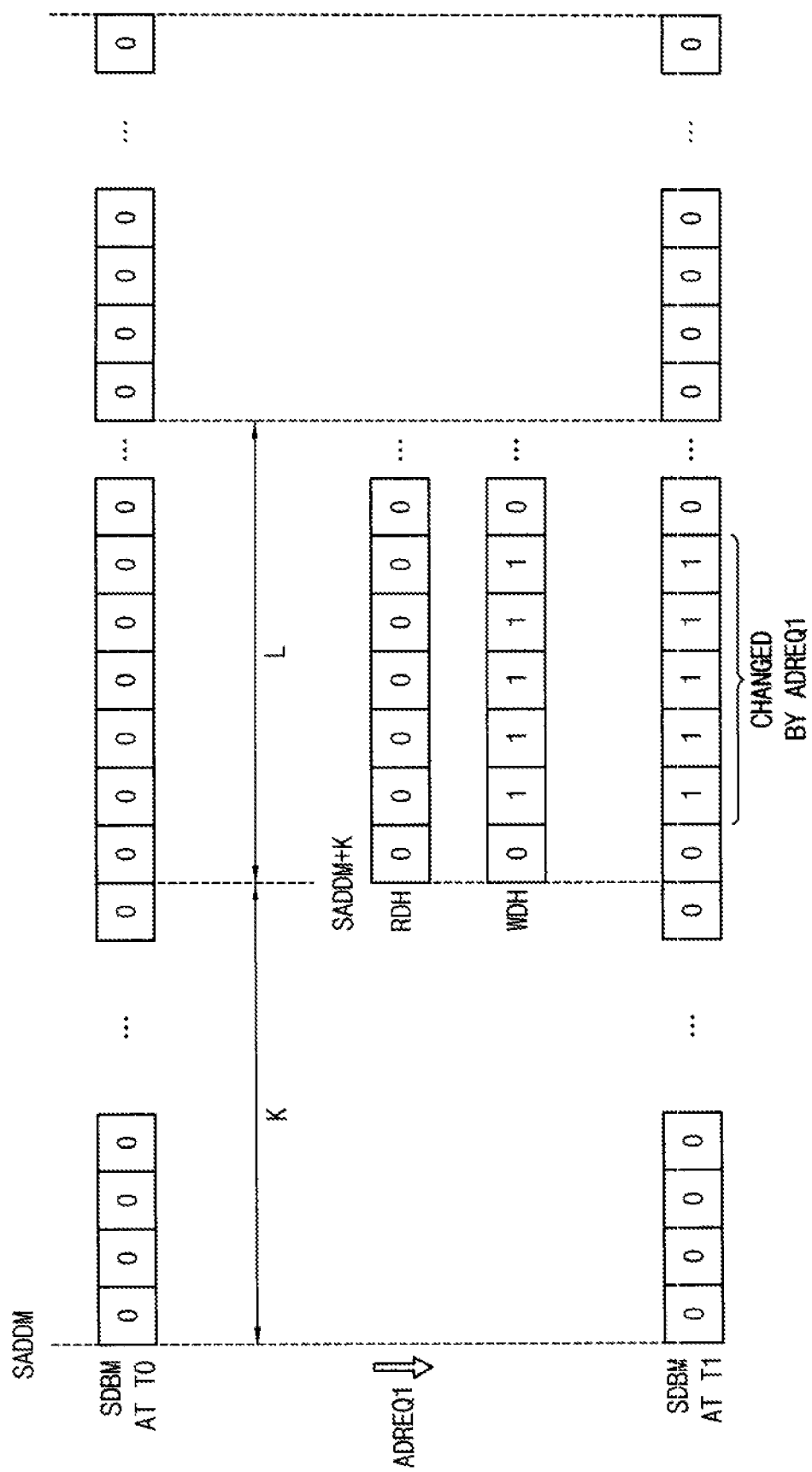
FIG. 8 illustrates an example procedure of the discard request of FIG. 7.

FIG. 7 illustrates an example embodiment of a discard request of a method of controlling discard operations according to example embodiments. FIG. 8 illustrates an example procedure of the discard request of FIG. 7.

Referring to FIGS. 7 and 8, in order to set bit values of the discard bits in the shared discard bitmap SDBM, first read data are read (by the host device) from the shared discard bitmap SDBM (S410). First write data are generated (by the host device) from the first read data by changing the discard bits corresponding to discardable sectors among the target sectors (S420). The discharge bits may be changed, for example, from a first value (e.g., "0") to a second value (e.g., "1"). The first wire data are stored (by the host device) in the shared discard bitmap (S430).

FIG. 8 illustrates example bit values that may be stored in the shared discard bitmap SDBM at a time point T0, before the first asynchronous discard request ADREQ1 is performed, and at a time point T1 after the first asynchronous discard request ADREQ1 is completed. The first read data RDH and the first write data WDH are also illustrated. Before an asynchronous request is generated or after the discard operations are completed with respect to the discardable target sectors, all of the discard bits may be set or changed to the first value, that is, "0".

The address range for the access to the shared discard bitmap SDBM may be represented by an access start address SADDM+K and an access size L. As described above, access size L may correspond, for example, to page size but may correspond to a different size in another embodiment.

Accordingly, as illustrated in FIG. 8, the bit values of the five discard bits corresponding to the five discardable target sectors may be changed from the first value "0" to the second value (e.g., "1"), according to the first asynchronous request ADREQ1.

Figure 9:
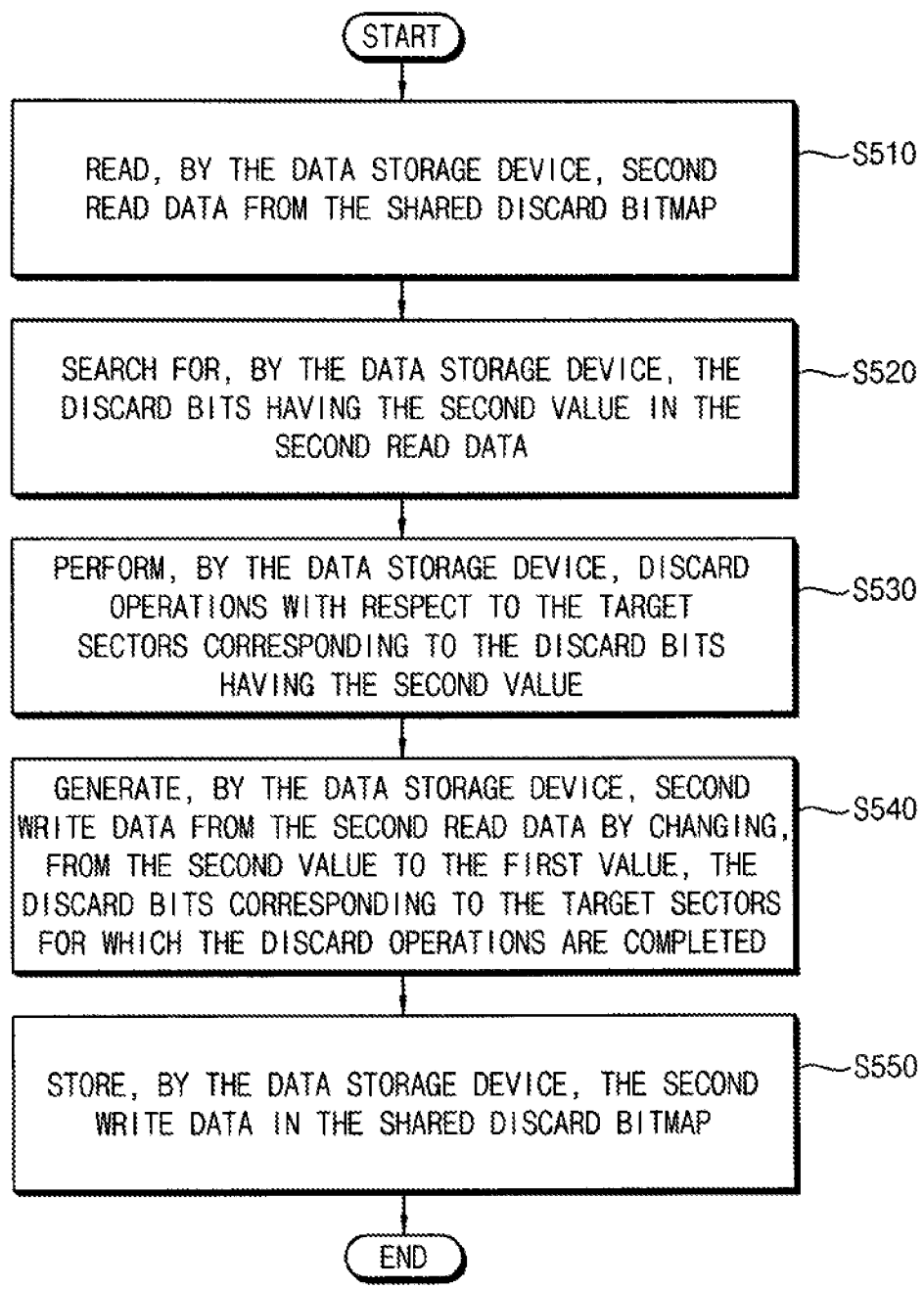
FIG. 9 illustrates an embodiment of an asynchronous discard operation.
Figure 10:
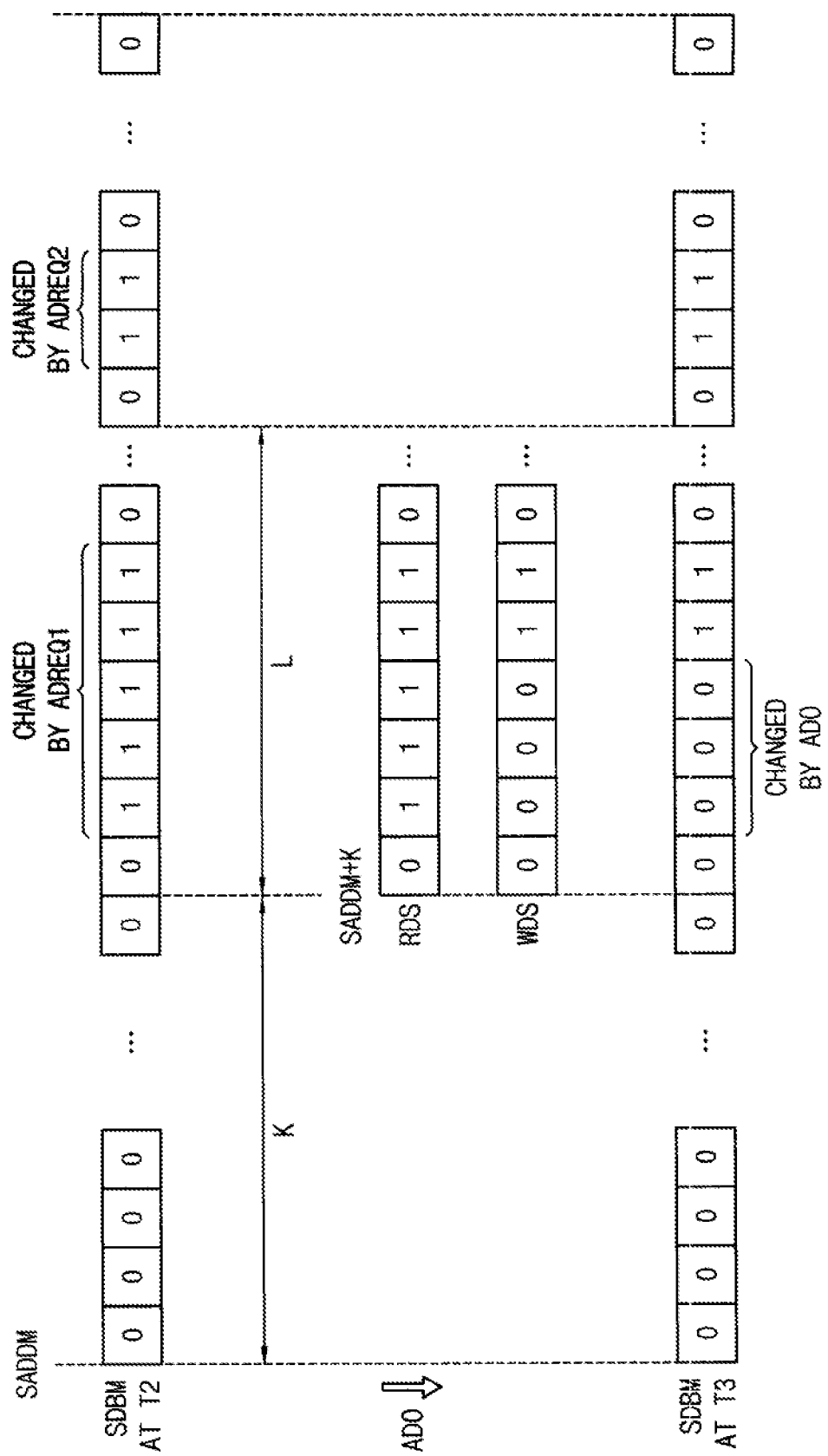
FIG. 10 illustrates an example procedure of the asynchronous discard operation.

FIG. 9 illustrates an example embodiment of an asynchronous discard operation of a method of controlling discard operations. FIG. 10 illustrates an example procedure of the asynchronous discard operation of FIG. 9.

Referring to FIGS. 9 and 10, in order to perform an asynchronous discard operation ADO with respect to the target sectors, second read data are read (by the data storage device) from the shared discard bitmap (S510). The discard bits having the second value (e.g., "1") in the second read data are searched for by the data storage device (S520). In some example embodiments, the discard bits may be scanned from the start address SADDM of the shared discard bitmap SDBM to search for the second value. The discard operations may be performed (by the data storage device) with respect to the target sectors corresponding to the discard bits having the second value (S530). Second write data are generated (by the data storage device) from the second read data by changing the discard bits corresponding to the target sectors for which the discard operations are completed (S540). The discard bits may be changed, for example, from the second value (e.g., "1") to the first value (e.g., "0"). The second write data are stored (by the data storage device) in the shared discard bitmap SDBM (S550).

FIG. 10 illustrates an example of bit values stored in the shared discard bitmap SDBM at a time point T2, before the asynchronous discard operation ADO is performed, and at a time point T3 after the asynchronous discard operation ADO is completed. The second read data RDS and the second write data WDS are also illustrated. For example, at time point T2 before the asynchronous discard operation ADO is performed, the shared discard bitmap SDBM ma store the discard bits having bit values changed by the first asynchronous discard request ADREQ1 and the second asynchronous discard request ADREQ2 of FIG. 6. As described above, the address range for the access to the shared discard bitmap SDBM may be represented by an access start address SADDM+K and an access size L.

The asynchronous discard operation ADO may be performed while the host device is in the idle state. If the host device changes to the active state before the discard operation is completed with respect to all of the discard bits having the second value of "1", the data storage device may stop the asynchronous discard operation APO. FIG. 10 illustrates an example where the asynchronous discard operation ADO has been performed with respect to three discard bits among the seven discard bits having the second value.

Figure 11:
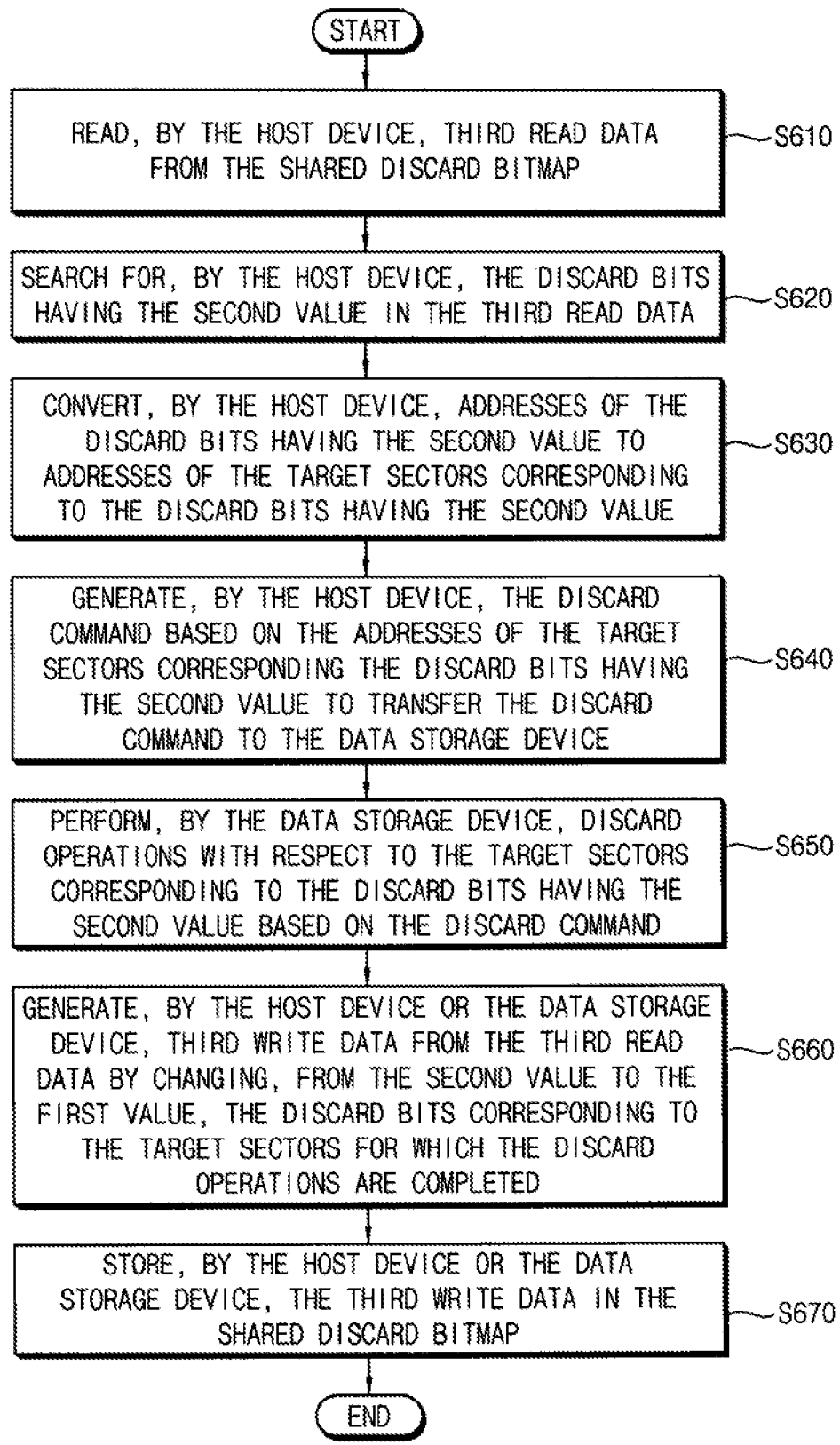
FIG. 11 illustrates an embodiment of a synchronous discard operation.
Figure 12:
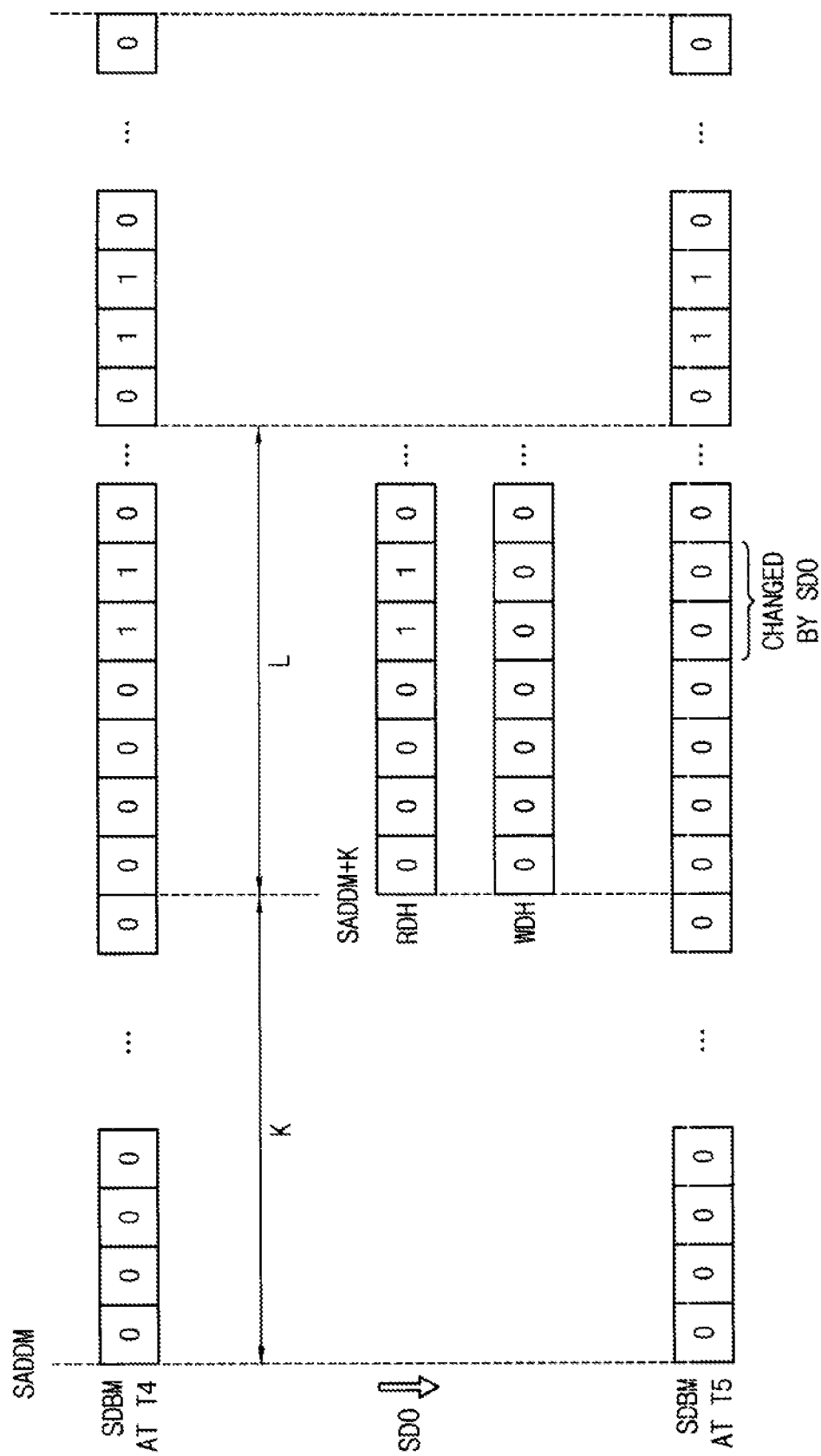
FIG. 12 illustrates an example procedure of the synchronous discard operation.

FIG. 11 illustrates an example embodiment of a synchronous discard operation of a method of controlling discard operations, FIG. 12 illustrates an example procedure of the synchronous discard operation of FIG. 11.

Referring to FIGS. 11 and 12, in order to perform a synchronous discard operation SDO, third read data are read (by the host device) from the shared discard bitmap (S610). The discard bits having the second value in the third read data are searched for by the host device (S620). Addresses of the discard bits having the second value are converted (by the host device) to addresses of the target sectors corresponding to the discard bits having the second value (S630). The discard command is generated (by the host device) based on the addresses of the target sectors that correspond to the discard bits having the second value. The discard command is transferred to the data storage device (S640).

The discard operations are performed (by the data storage device) with respect to the target sectors that correspond to the discard bits having the second value based on the discard command (S650). Third write data are generated (by the host device or the data storage device) from the third read data by changing the discard bits corresponding to the target sectors for which the discard operations are completed (S660). The discard bits may be changed from the second value (e.g., "1") to the first value (e.g., "0"). The third write data are stored, by the host device or the data storage device, in the shared discard bitmap (S670).

The addresses of the discard bit having the second value may be converted to the corresponding target sector, through calculation using the start address SADDM of the shared discard bitmap SDBM, the start address SADDA of the target sectors or the asynchronous discard region ADR and the unit size SZU of the target sector. For example, when the address of the discard bit is SADDM+i, the address of the corresponding target sector may be calculated as SADDA+i*SZU.

FIG. 12 illustrates examples of bit values stored in the shared discard bitmap SDBM at a time point T4, before the synchronous discard operation SDO is performed, and at a time point T5 after the synchronous discard operation SDO is completed. The third read data RDH and the third write data WDH are also illustrated. For example, the host device may transfer the discard command DSC indicating the address ranges of the target sectors that correspond to the two discard bits having the second value of "1". FIG. 12 illustrates an example where the synchronous discard operation SDO has been performed with respect to the two discard bits, among the four discard bits having the second value.

Figure 13:
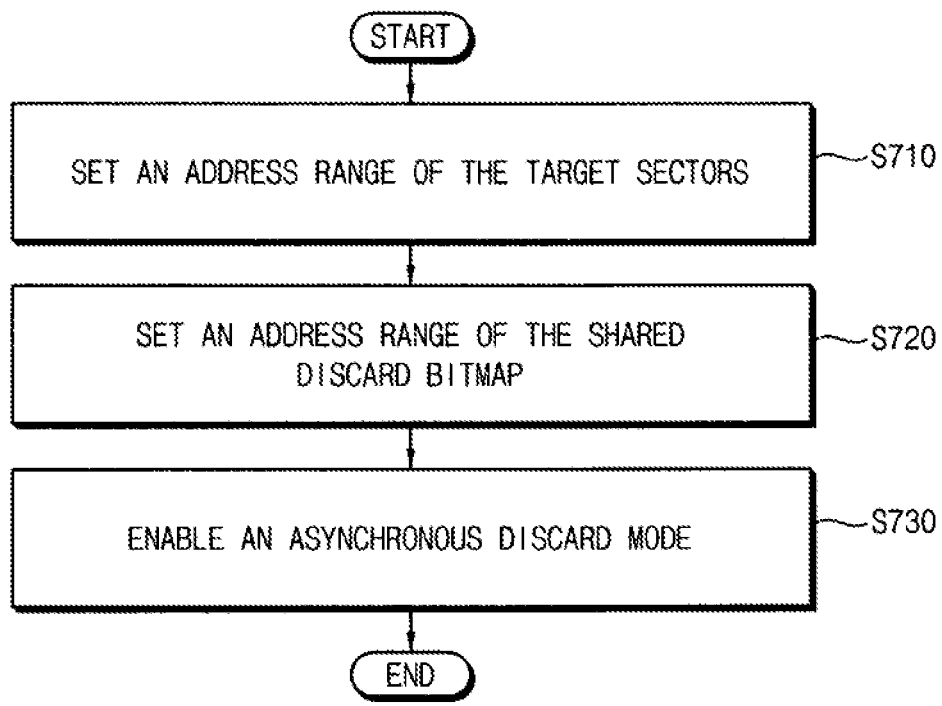
FIG. 13 illustrates an embodiment of a setting operation.

FIG. 13 illustrates an example embodiment of a setting operation of a method of controlling discard operations. Referring to FIG. 13, an address range of the target sectors is set (S710) and an address range of the shared discard bitmap SDBM is set (S720). When it is determined that the asynchronous discard operation ADO is required, an asynchronous discard mode is enabled (S730).

The address range of the target sectors or the asynchronous discard region ADR may be set based on an asynchronous discard region setting command from the host device to the data storage device. The asynchronous discard region setting command may include a start address of the target sectors and the number or a count of the target sectors.

The address range of the shared discard bitmap SDBM may be set based on a bitmap setting command from the host device to the data storage device. The bitmap setting command may include a start address of the shared discard bitmap SDBM and a unit size of each target sector corresponding to each discard bit.

The asynchronous discard mode to perform the asynchronous discard operation may be enabled or disabled based on a mode setting command from the host device to the data storage device.

In some example embodiments, the asynchronous discard region setting command, the bitmap setting command and the mode setting command may be generated according to command formats specified by the nonvolatile memory express (NVMe) standards. In this case, the asynchronous discard region setting command, the bitmap setting command, and the mode setting command may be defined using the reserved values in the command formats of the NVME standards. The information provided through the commands may be stored m memory, e.g., registers. The asynchronous discard operation and the synchronous discard operation based on the shared discard bitmap SDBM may be controlled using the stored values.

FIGS. 14 and 15 illustrate an example embodiment of setting an address range of target sectors in a method of controlling discard operations. FIG. 14 illustrates a start address ASYNC_DISCARD_SECTOR_ADDR[A1_3:A1_0] of the target sectors. FIG. 15 illustrates the number ASYNC_DISCARD_SECTOR_CNT[A2_3:A2_0] of the target sectors. The size of the start address ASYNC_DISCARD_SECTOR_ADDR[A1_3:A1_0] of the target sectors may be four bytes stored in four fields EXT_CSD[A1_0]~EXT_CSD[A1_3]. The size of the number of the target sectors ASYNC_DISCARD_SECTOR_CNT[A2_3:A2_0] may be four bytes stored in four fields EXT_CSD[A2_0]~EXT_CSD[A2_3]. All of A1_0, A1_1, A1_2, A1_3, A2,0, A2_1, A2_2, A2_3 indicate the positions of the fields. R/W/E indicates that the host device may read, write, and erase the corresponding information.

FIGS. 16, 17, and 18 illustrate an example embodiment of setting an address range of a shared discard bitmap in a method of controlling discard operations. FIG. 16 illustrates a start address SHARED_BITMAP_SECTOR_ADDR[S1_3:S1_0] of the shared discard bitmap SDBM. FIG. 17 illustrates a unit size SHARED_BITMAP_UNIT_SIZE[S3] of the target sector. FIG. 18 illustrates a bit number SHARED_BITMAP_SECTOR_CNT[S2_3:S2_0] of the shared discard bitmap SDBM. The start address SHARED_BITMAP_SECTOR_ADDR[S1_3:S1_0] of the shared discard bitmap SDBM may be four bytes stored in four fields SHARED_BITMAP_SECTOR_ADDR[S1_0]~SHARED_BITMAP_SECTOR_ADDR[S1_3]. The size of the unit size SHARED_BITMAP_UNIT_SIZE[S3] of the target sector may be one byte. The size of the bit number SHARED_BITMAP_SECTOR_CNT[S2_3:S2_0] of the shared discard bitmap SDBM may be four bytes stored in four fields SHARED_BITMAP_SECTOR_CNT[S2_0]~SHARED_BITMAP_SECTOR_CNT[S2_3]. All of S1_0, S1_1, S1_2, S1_3, S2,0, S2_1, S2_2, S2_3, S3 indicate the positions of the fields. R/W/E indicates that the host device may read, write, and erase the corresponding information. In one embodiment, R ONLY indicates that the host device may read the corresponding information but the write and erase operations are inhibited.

Only a value corresponding to the power of two may be stored in the unit size SHARED_BITMAP_UNIT_SIZE[S3] of the target sector. For example, "9" may be stored in the field and the real unit size may be calculated as 4 KB*$2^9$=2 MB, where 4 KB is a minimum size of file generation by a file system which may be varied according to file systems. As described above, the bit number of the discard bits of the shared discard bitmap SDBM may be calculated based on the number of the target sectors and the unit size of each target sector.

FIG. 19 illustrates an example embodiment of setting a mode in a method of controlling discard operations. Referring to FIG. 19, a control value ASYNC_DISCARD_CTRL[C1] is illustrated indicating enable or disable of the asynchronous discard mode. The control value ASYNC_DISCARD_CTRL[C1] may be one byte including eight bits BT0~BT7. For example, when the value ASYNC_DISCARD_ENABLE of the least significant bit BT0 is set to a first value (e.g., "0"), the asynchronous discard mode may be enabled. In contrast, the value ASYNC_DISCARD_ENABLE is set to a second value (e.g., "1"), the asynchronous discard mode may be disabled. The other bits BT1~BT7 may be reserved for other operation modes and/or operation conditions, R/W/E indicates that the host device may read, write, and erase the corresponding information.

Figure 20:
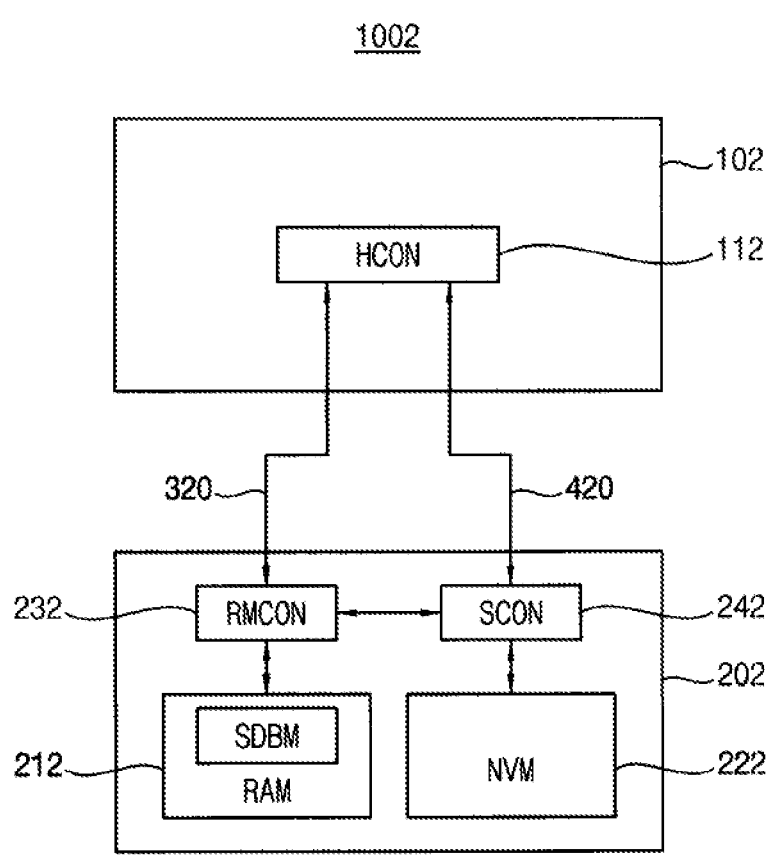
FIGS. 20 and 21 illustrate embodiments of systems.

FIG. 20 illustrates an embodiment of a system 1002 which includes a host device 102 and the storage device 202. The host device 102 may include a host controller HCON 112, e.g., a central processing unit (CPU). The storage device 202 may include a random access memory device RAM 212, a nonvolatile memory device NVM 222, a random memory controller RMCON 232, and a storage controller SCON 242.

In some example embodiments, as illustrated in FIG. 20, the above-described shared discard bitmap SDBM may be stored in the random access memory device 212. In this case, the host device 101 may access the shared discard bitmap SDBM through a memory-mapped input-output (MMIO) interface 320 between the host device and the data storage device The host controller 112 may control access to the nonvolatile memory device 222 and overall operations of the host device 102. The host controller 112 may access the random access memory device 212, the nonvolatile memory device 221, and the shared discard bitmap SDMB using a virtual address space, an example of which is described below with reference to FIG. 22. The host controller 112 may generate a block access command to access the nonvolatile memory device 222 in units of blocks and a byte access command to access the random access memory device 212 in units of bytes.

The random memory controller 232 may receive the byte access command from the host device 102 through the MMIO interface 320. The host device 102 may perform access to the random access memory device 212 in units of bytes based on the byte access command.

The storage controller 241 may receive the block access command from the host device 102 through the interface 420. The storage controller 241 may the access to the nonvolatile memory device 222 in units of blocks based on the block access command.

Each of the MMIO interface 320 and the block accessible interface 420 may be implemented in hardware (e.g., a bus system), software (e.g., a drive program), or a combination of hardware and software.

In some example embodiments, the random access memory device 212 of the data storage device 202 may be connected to the host controller 112 of the host device 102 through the byte accessible interface 320, which may include, for example, a peripheral component interconnect express (PCIe) bus.

In some example embodiments, the nonvolatile memory device 222 of the data storage device 202 may be connected to the host controller 112 of the host device 102 through the block accessible interface 420, which may include, for example, a serial advanced technology attachment (SATA) bus, a nonvolatile memory express (NVMe) bus, or a serial attached SCSI (SAS) bus.

The random access memory device 212 may be an arbitrary volatile memory device accessed by the host device 102 through the MMIO interface 320. For example, the random access memory device 212 may be implemented, for example, as a dynamic random access memory (DRAM) or a static random access memory (SRAM) having a relatively high operational speed.

The nonvolatile memory device 222 may be an arbitrary memory device accessed by the host device 102 through the block accessible interface 420. For example, the nonvolatile memory device 222 may be implemented, for example, by an electrically erasable programmable read only memory (EEPROM), flash memory, phase change random access memory (PRAM), resistance random access memory (RRAM), nano floating gate memory (NFGM), polymer random access memory (PoRAM), magnetic random access memory (MRAM), ferroelectric random access memory (FRAM), or the like.

Figure 21:
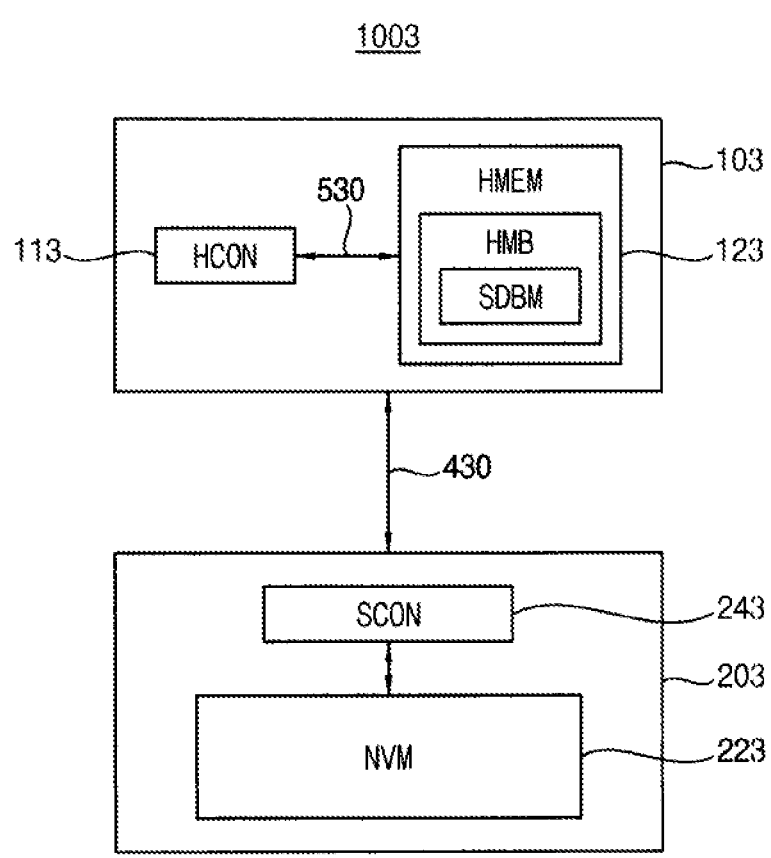

FIG. 21 illustrates an embodiment of a system 1003 which includes a host device 103 and the storage device 203. The host device 103 may include a host controller HCON 113 and a host memory HMEM 123. The host controller 113 may control overall operations of the host device 203. The host controller 113 may be, for example, a hardware-based data processing device that includes a circuit physically configured to execute operations expressed by commands included in code or a program. For example, the host controller 113 may be a system-on-chip (SoC), a general purpose processor, a specific-purpose processor, an application processor or the like.

The host memory 123 may be implemented, for example, as a random access memory configured to communicate with the host controller 113 and function as a main memory, a buffer memory, or a cache memory of the host device 103. The host controller 113 may store code or data at the host memory 123 temporarily. The host controller 113 may execute a variety of software (e.g., by an operating system and an application) by using the host memory 123. The host memory 123 may include volatile memory (e.g., static RAM (SRAM), dynamic RAM (DRAM), or synchronous DRAM (SDRAM)) or nonvolatile memory (e.g., phase-change RAM (PRAM), magnetic RAM (MRAM), resistive RAM (RRAM), or ferroelectric RAM (FRAM)).

When the host device 103 and the data storage device 203 are configured so that data of the data storage device 203 is loaded to the host memory 123, the host controller 113 may assign a portion of a memory space of the host memory 123 to be used by the data storage device 203. In this case, the host region of the host memory 123 may be used by the host device 103 and the host memory buffer HMB may be assigned to be used by the data storage device 203.

The host controller 113 may include a memory controller configured to control the host memory 123. The host controller 113 may use the host region of the host memory 123 through the memory controller. When the host memory buffer HMB is provided for the data storage device 203, the data storage device 203 may use the host memory buffer HMB without intervention of the host controller 113.

In some example embodiments, as illustrated in FIG. 21, the above-described shared discard bitmap SDBM may be stored in the host memory buffer HMB that is set in the host memory 123 in the host device 103. In this case, the host device 103 may access the shared discard bitmap SDBM directly, regardless of an interface between the host device 103 and the data storage device 203.

The data storage device 203 may include a storage controller SCON 243 and a nonvolatile memory device NVM 223. The storage controller 243 may control overall operations of the data storage device 203. The storage controller 243 may perform data communication with the host device 103. An interface 430 between the storage controller 243 and the host device 103 may be configured to implement one or more data communication protocols or specifications. For example, the interface 430 may support communication using at least one of a Universal Serial Bus (USB), Advanced Technology Attachment (ATA), serial ATA (BATA), Small Computer Small Interface (SCSI), serial attached SCSI (SAS), parallel ATA (PATH), High Speed Inter-Chip (HSIC), Firewire, Peripheral Component Interconnection (PCI), PCI express (PCIe), Nonvolatile Memory Express (NVMe), Universal Flash Storage (UPS), Secure Digital (SD), Multi-Media Card (MMC), embedded MMC (eMMC), or another standard.

Figure 22:
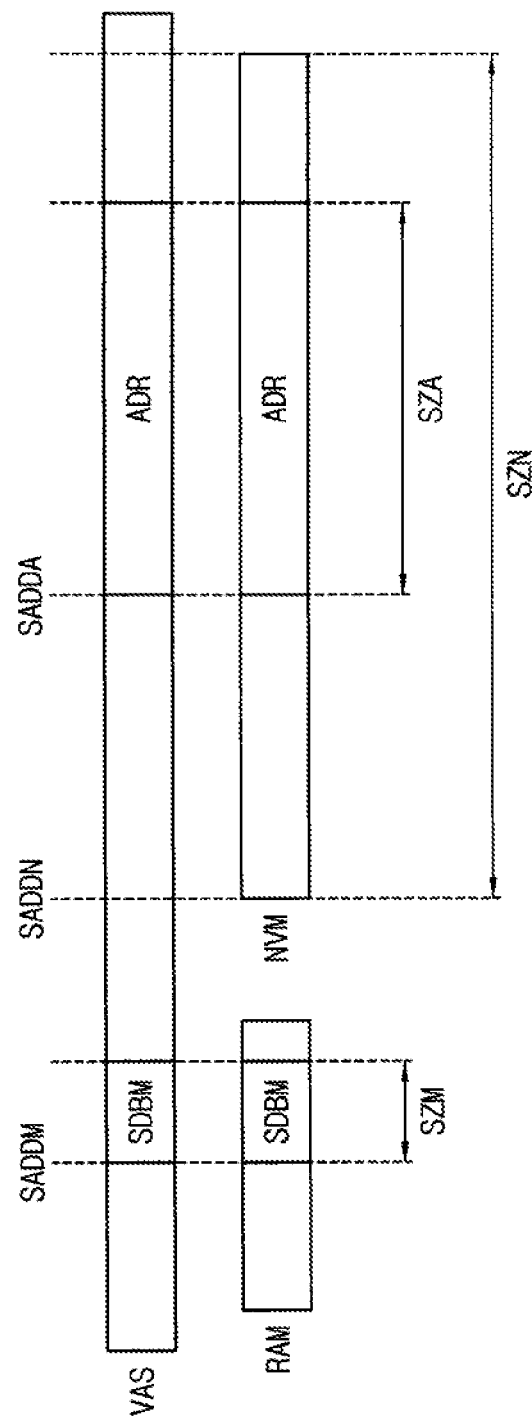
FIG. 22 illustrates an example of address mapping of the systems of FIGS. 20 and 21.

FIG. 22 illustrates an example of address mapping, of the systems of FIGS. 20 and 21. Referring to FIG. 22, a virtual address space VAS of the host device may include a shared discard bitmap SDBM and an asynchronous discard region ADR.

The shared discard bitmap SDBM of the virtual address space VAS is mapped to the shared discard bitmap SDBM of the random access memory RAM, and the asynchronous discard region ADR of the virtual address space VAS is mapped to the asynchronous discard region ADR of the nonvolatile memory device NVM. The asynchronous discard region ADR may be a portion of or the entire nonvolatile memory device NVM. For example, the size SZA of the asynchronous discard region ADR may be smaller than or equal to the size SZN of the nonvolatile memory device NVM. The shared discard bitmap having size SZM proportional to size SZA of the asynchronous discard region ADR may be included in the random access memory RAM. The random access memory RAM may be the random access memory 212 in FIG. 20 or the host memory buffer HMB in FIG. 21. The host device may access the respective regions of the random access memory RAM and the nonvolatile memory device NVM based on mapping relations of the virtual address space VAS with the random access memory RAM and the nonvolatile memory device NVM.

Figure 23:
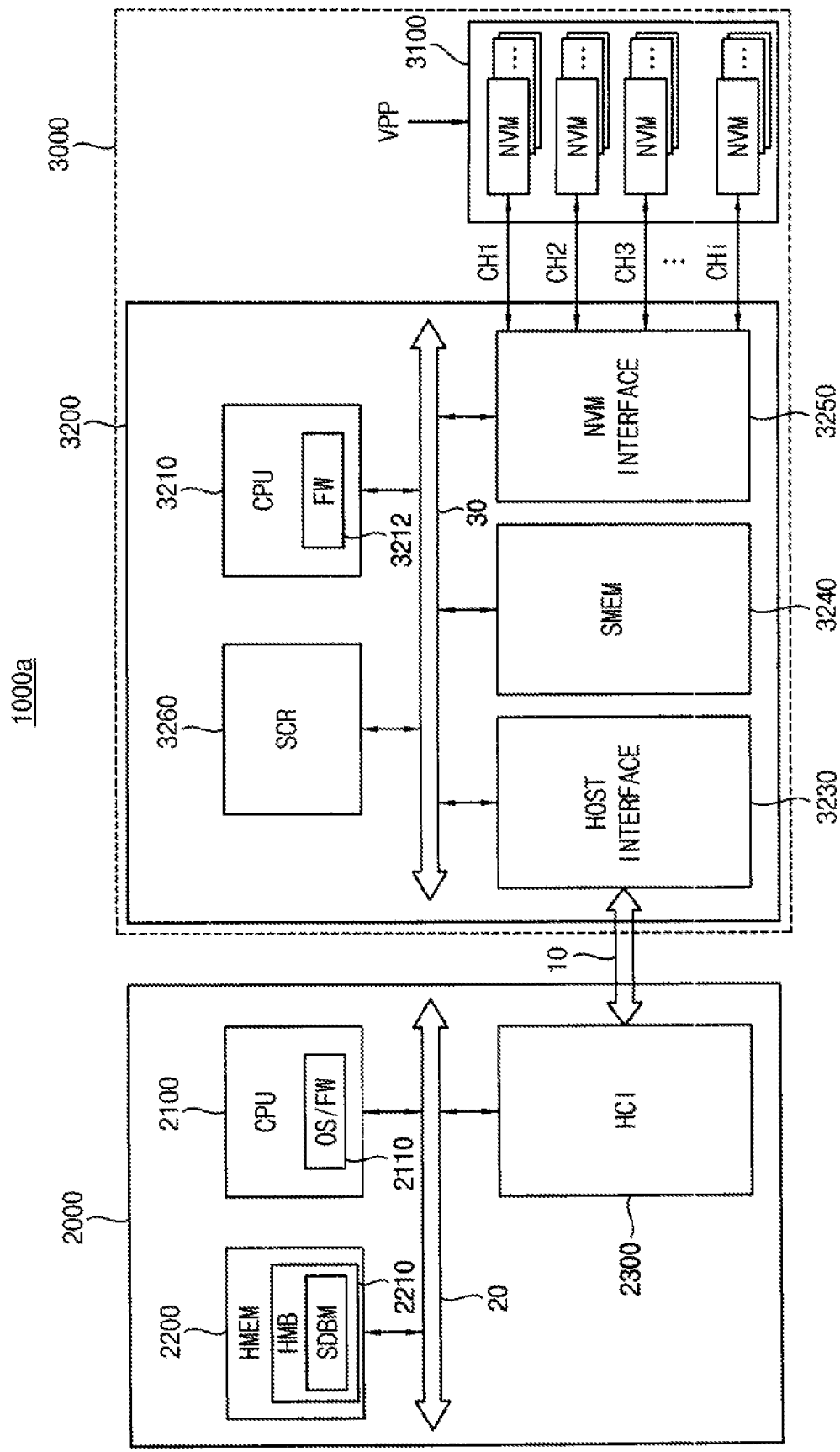
FIG. 23 illustrates an embodiment of a system including a data storage device.

FIG. 23 illustrates an embodiment of a system 1000a which includes a host device 2000 and a storage device

3000. For example, the storage device 3000 may be an embedded multimedia card (eMMC), a universal flash storage (UFS), or a solid state drive (SSD). The host device 2000 may be configured to control data processing operations, such as data read operations and data write operations. The system 1000a of FIG. 23 may be an arbitrary electronic system.

The host device 2000 includes a processor (CPU) 2100, a host memory (HMEM) 2200, and a host controller interface (HCI) 2300 connected through a bus 20. The host memory 2200 includes a host memory buffer HMB 2210 that stores a shared discard bitmap SDBM. An operating system (OS) and/or host firmware (FW) 2110 may be executed by the processor 2100. The processor 2100 may include hardware and/or software for controlling generation of a command CMD, analysis of a response RES, storing of data. In a register, e.g., an extended (EXT)_CSD register of the storage device 3000, and/or data processing. The processor 2100 may execute the operating system and the host firmware 2110 to perform these operations.

The host controller interface 2300 may serve as an interface with the storage device 3000. For example, host controller interface 2300 may be configured to issue the command CMD to the storage device 3000, receive the response RES to the command CMD from the storage device 3000, transmit write data to the storage device 3000, and receive read data from the storage device 3000.

The storage device 3000 may include, for example, multiple non-volatile memory devices (NVM) 3100 and a storage controller 3200.

The nonvolatile memory devices 3100 may be optionally supplied with an external high voltage VPP. The storage controller 3200 may be connected to the nonvolatile memory devices 3100 through multiple channels CH1 to CHi. The storage controller 3200 may include one or more processors CPU 3210, a host interface 3230, a storage memory SMEM 3240, a nonvolatile memory interface 3250, and a security engine SCR 3260 connected through a bus 30.

The storage memory 3240 may store data used to operate the storage controller 3200. The storage memory 3240 may be a volatile memory device, for example, dynamic random access memory (DRAM) or static random access memory (SRAM). FIG. 23 illustrates an embodiment where the storage memory 3240 is in the storage controller 3200. In another embodiment, the storage memory 3240 may be outside the storage controller 3200.

The processor 3210 may be configured to control overall operations of the storage controller 3200. For example, the processor 3210 may operate firmware 3212 including a flash translation layer (FTL) and may include other firmware. The FTL may perform various functions, e.g., address mapping, read calibration, error correction, among other functions.

Although FIG. 23 shows that the security engine 3260 is outside the host interface 3230, the security engine 3260 may be in the host interface 3230 in another embodiment. The host interface 3230 may serve as an interface with external devices such as the host device 2000. The nonvolatile memory interface 3250 may serve as an interface with the nonvolatile memory devices 3100. The host device 2000 and the storage device 3000 may be connected through a bus 10.

Figure 24:
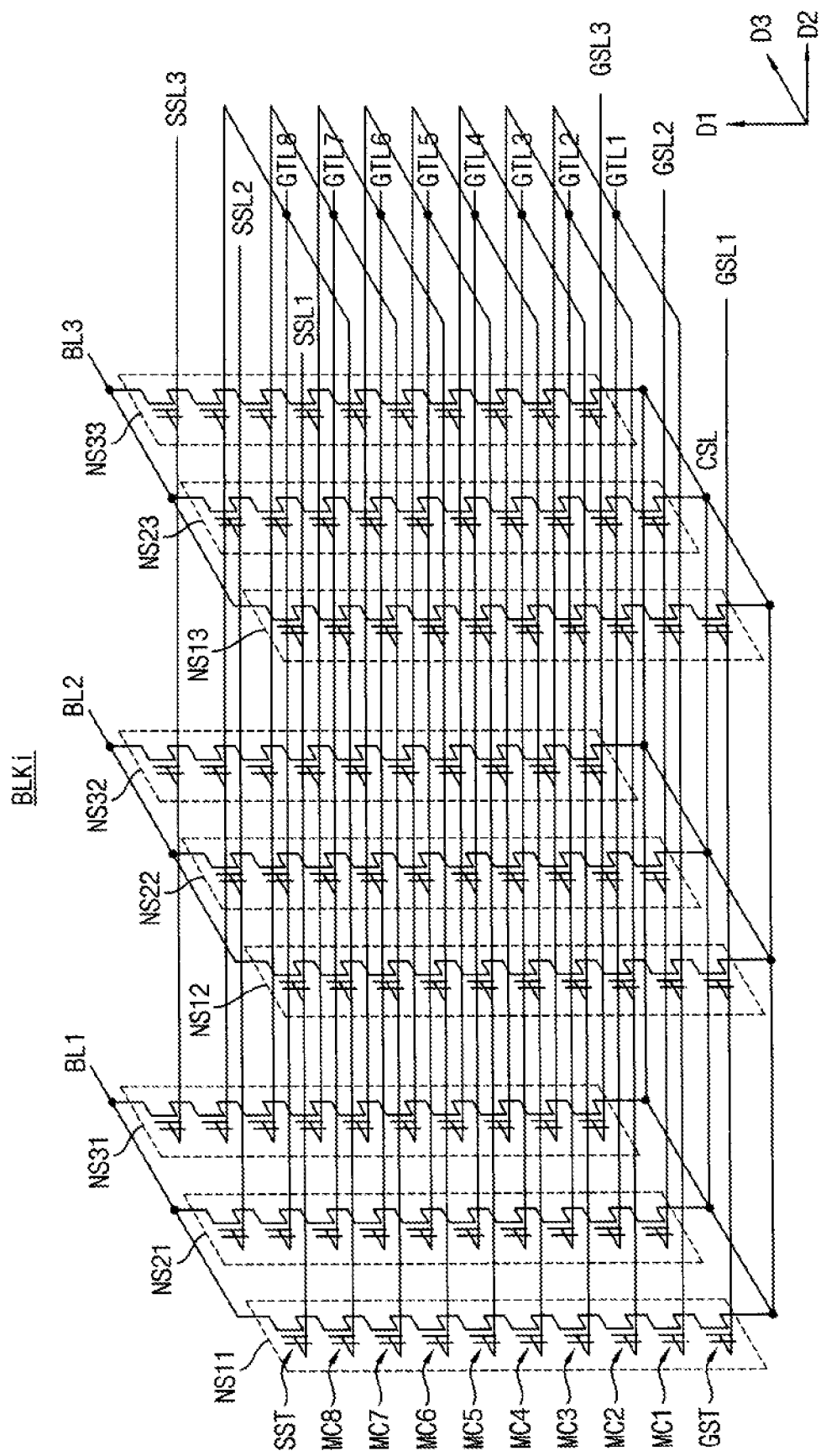
FIG. 24 illustrates an embodiment of a nonvolatile memory device.

FIG. 24 illustrates an embodiment of an equivalent circuit of a nonvolatile memory device in the system of FIG. 23. The memory block BLKi of FIG. 24 may be formed on a substrate in a three-dimensional structure (or a vertical structure). For example, a plurality of NAND strings or cell strings in the memory block BLKi may be formed in the first direction D1 perpendicular to the upper surface of the substrate.

Referring to FIG. 24, the memory block BLKi may include NAND strings NS11 to NS33 coupled between bit lines BL1, BL2, and BL3 and a common source line CSL. Each of the NAND strings NS11 to NS33 may include a string selection transistor SST, a plurality of memory cells MC1 to MC8, and a ground selection transistor GST. In FIG. 24, each of the NAND strings NS11 to NS33 is illustrated to include eight memory cells MC1 to MC8. However, in some example embodiments, each of the NAND strings NS11 to NS33 may include any number of memory cells.

Each string selection transistor SST may be connected to a corresponding string selection line (one of SSL1 to SSL3). The plurality of memory cells MC1 to MC8 may be connected to corresponding gate lines GTL1 to GTL8, respectively. The gate lines GTL1 to GTL8 may be word lines and some of the gate lines GTL1 to GTL8 may be dummy word lines. Each ground selection transistor GST may be connected to a corresponding ground selection line (one of GSL1 to GSL3). Each string selection transistor SST may be connected to a corresponding bit line (e.g., one of BL1, BL2 and BL3), and each ground selection transistor GST may be connected to the common source line CSL.

Word lines (e.g., WL1) having the same height may be commonly connected, and the ground selection lines GSL1 to GSL3 and the string selection lines SSL1 to SSL3 may be separated. The gate lines corresponding to the intermediate switching lines may be separated. In FIG. 24, the memory block BLKi is illustrated to be coupled to eight gate lines GTL1 to GTL8 and three bit lines BL1 to BL3. In one embodiment, each memory block in the memory cell array may be coupled to a different number of word lines and a different number of bit lines.

Figure 25:
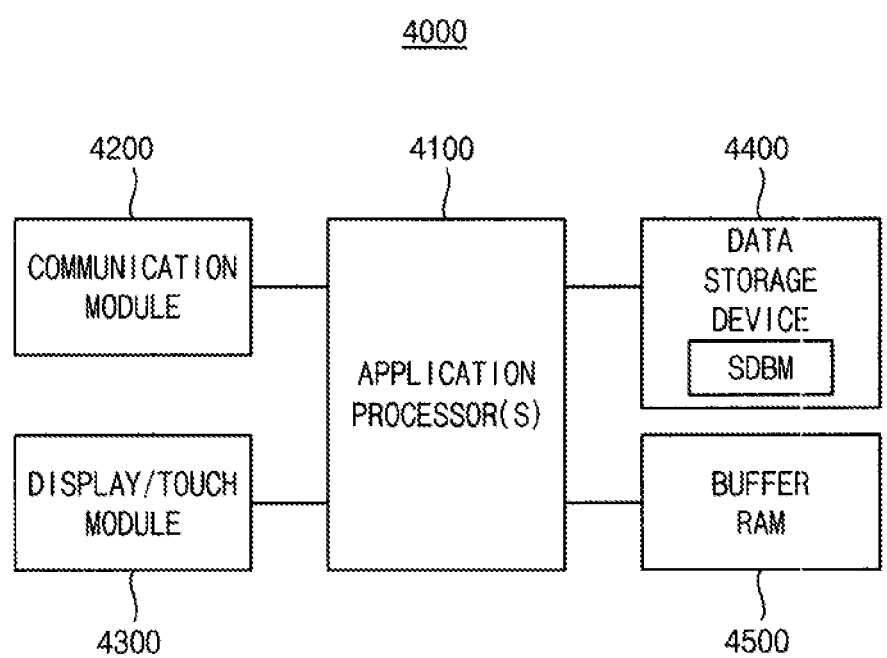
FIG. 25 illustrates an embodiment of a mobile device.

FIG. 25 illustrates an embodiment of a mobile device 4000 which includes an application processor 4100 (including one or more application processors), a communication module 4200, a display/touch module 4300, a data storage device 4400, and a buffer RAM 4500. The application processor 4100 controls operations of the mobile device 4000. The communication module 4200 is implemented to perform wireless or wire communications with an external device. The display/touch module 4300 is implemented to display data processed by the application processor 4100 and/or to receive data through a touch panel. The data storage device 4400 is implemented to store user data.

The data storage device 4400 may be, for example, an embedded multimedia card (eMMC), a solid state drive (SSD), a universal flash storage (UFS) device, or the like. The data storage device 4400 may include the shared discard bitmap SDBM for the asynchronous discard operation as described above.

The buffer RAM 4500 temporarily stores data used for processing operations of the mobile device 4000. For example, the buffer RAM 4500 may be double data rate (DDR) synchronous DRAM (SDRAM), low power DDR (LPDDR) SDRAM, graphics DDR (GDDR) SDRAM, Rambus DRAM (RDRAM®), or the like.

In accordance with one or more of the aforementioned embodiments, a system including a data storage device, and a method of controlling discard operations, may prevent inefficient garbage collection and enhance the operational speed, lifetime, and performance of the system through the use of asynchronous discard operations and/or synchronous discard operations that use a shared discard bitmap shared by the host device and data storage device.

The embodiments described herein may be applied to a data storage device and any of a variety of electronic systems that include a data storage device. Examples include a memory card, a solid state drive (SSD), an embedded multimedia card (eMMC), a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

The foregoing is illustrative of example embodiments and is not to be construed as limiting thereof. Although a few example embodiments have been described, those skilled in the art will readily appreciate that many modifications are possible in the example embodiments without materially departing from the inventive concepts.

What is claimed is:

1. A method of controlling discard operations in a system including a host device and a data storage device, the method comprising:
   providing a shared discard bitmap accessed commonly by the host device and the data storage device, the shared discard bitmap including discard bits in one-to-one correspondence with target sectors, among a plurality of sectors of a nonvolatile memory device in the data storage device;
   setting, by the host device, bit values of the discard bits stored in the shared discard bitmap, the bit values set to indicate whether data stored in each of the target sectors are discardable, wherein setting of the bit values includes:
   (i.) reading, by the host device, first read data from the shared discard bitmap;
   (ii.) generating, by the host device, first write data from the first read data by changing the discard bits corresponding to discardable sectors among the target sectors, the discard bits changed from a first value to a second value;
   (iii.) storing, by the host device, the first write data in the shared discard bitmap; and
   performing, by the data storage device, an asynchronous discard operation with respect to the target sectors based on the bit values of the discard bits stored in the shared discard bitmap.

2. The method of claim 1, wherein performing the asynchronous discard operation includes:
   reading, by the data storage device, second read data from the shared discard bitmap;
   searching, by the data storage device, for the discard bits having the second value in the second read data;
   performing, by the data storage device, discard operations with respect to the target sectors corresponding to the discard bits having the second value;
   generating, by the data storage device, second write data from the second read data by changing the discard bits corresponding to the target sectors for which the discard operations are completed, the discard bits changed from the second value to the first value; and
   storing, by the data storage device, the second write data in the shared discard bitmap.

3. The method of claim 1, wherein the asynchronous discard operation is performed based on the shared discard bitmap regardless of commands from the host device.

4. The method of claim 3, wherein the asynchronous discard operation is performed during an idle state of the host device.

5. The method of claim 1, further comprising:
   performing a synchronous discard operation with respect to the target sectors based on a discard command generated by the host device based on the shared discard bitmap, the discard command transferred to the data storage device.

6. The method of claim 5, wherein performing the synchronous discard operation includes:
   reading, by the host device, third read data from the shared discard bitmap;
   searching, by the host device, for the discard bits having the second value in the third read data;
   converting, by the host device, addresses of the discard bits having the second value to addresses of the target sectors corresponding to the discard bits having the second value;
   generating, by the host device, the discard command based on the addresses of the target sectors corresponding to the discard bits having the second value, the discard command transferred to the data storage device;
   performing, by the data storage device, discard operations with respect to the target sectors corresponding to the discard bits having the second value based on the discard command;
   generating, by the host device or the data storage device, third write data from the third read data by changing the discard bits corresponding to the target sectors for which the discard operations are completed, the discard bits changed from the second value to the first value; and
   storing, by the host device or the data storage device, the third write data in the shared discard bitmap.

7. The method of claim 1, further comprising:
   setting an address range of the target sectors based on an asynchronous discard region setting command provided from the host device to the data storage device.

8. The method of claim 7, wherein the asynchronous discard region setting command includes a start address of the target sectors and a number of the target sectors.

9. The method of claim 1, further comprising:
   setting an address range of the shared discard bitmap based on a bitmap setting command provided from the host device to the data storage device.

10. The method of claim 1, further comprising:
    enabling an asynchronous discard mode to perform the asynchronous discard operation based on a mode setting command provided from the host device to the data storage device.

11. The method of claim 1, wherein:
    the shared discard bitmap is stored in the nonvolatile memory device included in the data storage device, and
    the host device accesses the shared discard bitmap through a block accessible interface between the host device and the data storage device.

12. The method of claim 1, wherein:
    the shared discard bitmap is stored in a host memory buffer that is set in a host memory included in the host device, and
    the host device accesses the shared discard bitmap directly regardless of an interface between the host device and the data storage device.

13. A method of controlling discard operations in a system including a host device and a data storage device, the method comprising:

providing a shared discard bitmap accessed commonly by the host device and the data storage device, the shared discard bitmap including discard bits in one-to-one correspondence with target sectors, among a plurality of sectors of a nonvolatile memory device in the data storage device;

setting, by the host device, bit values of the discard bits stored in the shared discard bitmap, the bit values set to indicate whether data stored in each of the target sectors are discardable;

performing, by the data storage device, an asynchronous discard operation with respect to the target sectors based on the bit values of the discard bits stored in the shared discard bitmap; and setting an address range of the shared discard bitmap based on a bitmap setting command provided from the host device to the data storage device, wherein the bitmap setting command includes a start address of the shared discard bitmap and a unit size of each target sector corresponding to each discard.

14. A method of controlling discard operations in a system including a host device and a data storage device, the method comprising:

providing a shared discard bitmap accessed commonly by the host device and the data storage device, wherein the shared discard bitmap is stored in a random access memory device included in the data storage device, and wherein the shared discard bitmap includes discard bits in one-to-one correspondence with target sectors, among a plurality of sectors of a nonvolatile memory device in the data storage device;

setting, by the host device, bit values of the discard bits stored in the shared discard bitmap, wherein the bit values are set to indicate whether data stored in each of the target sectors are discardable, and wherein the host device accesses the shared discard bitmap through a memory mapped input output interface between the host device and the data storage device; and performing, by the data storage device, an asynchronous discard operation with respect to the target sectors based on the bit values of the discard bits stored in the shared discard bitmap.

\* \* \* \* \*